United States Patent Office.

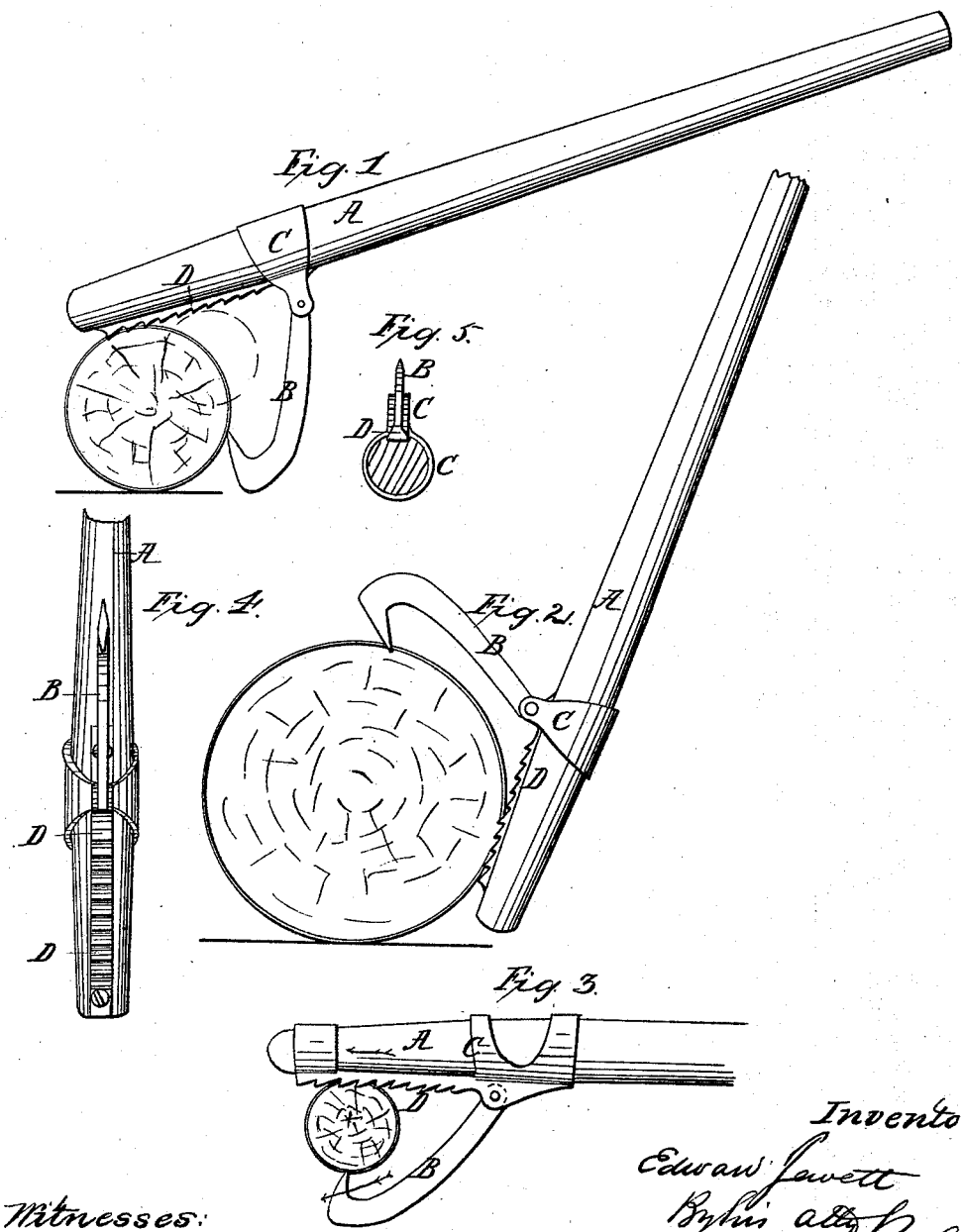

EDWARD JEWETT, OF RINDGE, NEW HAMPSHIRE.

Letters Patent No. 68,883, dated September 17, 1867.

IMPROVEMENT IN CANT-HOOKS.

*The Schedule referred to in these Letters Patent and making part of the same.*

TO ALL WHOM IT MAY CONCERN:

Be it known that I, EDWARD JEWETT, of Rindge, in the county of Cheshire, and State of New Hampshire, have invented a new and useful Improvement in Cant-Hooks; and I do hereby declare the following to be a full, clear, and exact description of the same, reference being had to the accompanying drawings, in which—

Figures 1, 2, and 3 represent my hook in operation upon logs of different sizes.

Figure 4 is a view of the lower edge of the lever and the serrated plate, and

Figure 5 a transverse section of the same.

My invention relates to a cant-hook which will operate with equal facility upon logs of various sizes, and without requiring any adjustment of the hook; and it consists in constructing the implement with a series of teeth projecting from the lower side of the lever in front of the shank of the hook, so that when applied to the surface of the log the lever cannot slip thereon, and the hook will therefore be made to penetrate and hold in place.

That others may understand my invention, and its mode of operation, I will particularly describe it.

As cant-hooks are commonly constructed, the hook has a number of holes through its shank in a line up and down its side. Through one of these holes the joint-bolt passes, and it is necessary to shift it frequently to adapt the hook to the sizes of logs upon which the hook is to operate. This adjustment is necessary, because if the log is smaller in diameter than the distance from the point of the hook to the lever, when in about the position shown in fig. 1, the hook cannot be made to hold, for the lever will slip endways upon the top of the log, and the distance between the point of the hook and the lever will become greater than the diameter of the log. With the common cant-hook the force which causes the log to revolve is exerted through the hook alone, the lever simply exerting pressure against the surface of the log. With my cant-hook the teeth on the under side of the lever bite into the log and permit a pressure through the lever in the direction of its length, so that while the hook pulls against one side of the log the lever pushes against the other. The power to move a given log is not increased by the presence of the teeth above mentioned, but the hook is enabled to seize and hold to a log of smaller size than would otherwise be possible, and the general operation of the implement will be much more satisfactory.

A is the lever, to which the hook B is attached by a joint. The serrated plate D is attached to the lower side or edge of the lever A by screws, or in some other convenient and secure way. These serrations are made crosswise of the plate, and in such manner that the line of the edge of each tooth is transverse to the length of the plate, so that whilst in action the teeth may bite or press into the log in the direction of the grain, and take a secure hold or purchase. These toothed edges may be of the same breadth as the plate itself, as shown in the drawings, or, if desired, they may be made somewhat narrower, or tapering, by cutting away or bevelling their sides, as shown in white lines in fig. 4, and red lines in fig. 5. It will be observed that the teeth when made somewhat broad not only take a firm hold upon the log, but also prevent the liability of the lever to roll or cant sidewise, as it would tend to do if the plate were sharp-edged at its point of contact with the log, and if it were not serrated. The edges of the teeth are towards the front end of the lever, and their mode of operation is shown in the figures.

The small red circle in fig. 1 represents a log of small diameter, and the inability of the hook to gripe such a log unless they are brought into the relative positions shown in fig. 3 is apparent; and it is equally apparent that those relative positions could not be maintained, so that the implement could work successfully, except with the aid of the serrations D, or their equivalents.

I do not claim a sharp-edged rib, or a rib without serrations projecting from the lever.

Having described my invention, and its mode of operation, what I claim as new, is—

The combination in a cant-hook of the hook B and serrated plate D, constructed and operating substantially as and for the purpose set forth.

EDWARD JEWETT.

Witnesses:
    D. B. VENTRE,
    R. D. O. SMITH.